United States Patent Office 3,769,349
Patented Oct. 30, 1973

3,769,349
PROCESS FOR PREPARING 2,4-DIHYDROXY-BENZOPHENONES
Masuo Yukutomi, Fuchu, Yoshitaka Tanaka, Sagamihara, and Satosi Genda and Masaki Kitaura, Tokyo, Japan, assignors to Kyodo Chemical Co., Ltd., Tokyo, Japan
No Drawing. Continuation of abandoned application Ser. No. 700,729, Jan. 26, 1968. This application June 15, 1970, Ser. No. 48,870
Claims priority, application Japan, Jan. 27, 1967, 42/4,999
Int. Cl. C07c 49/82
U.S. Cl. 260—591                                      4 Claims

ABSTRACT OF THE DISCLOSURE 2,4-dihydroxybenzophenones, which are useful ultraviolet ray-absorbing agents or intermediates thereof, are prepared substantially quantitatively by reacting resorcinols with benzotrichlorides in the presence of a mixed solvent comprising water and a water-soluble organic solvent such as a lower alcohol, lower fatty acid, or the like.

CROSS REFERENCE TO RELATED APPLICATION

This application is a continuation of our earlier application Ser. No. 700,729 filed Jan. 26, 1968 and now abandoned.

FIELD OF THE INVENTION

An improved process for preparing 2,4-dihydroxybenzophenones.

PRIOR ARTS

Heretofore, 2,4-dihydroxybenzophenones have been prepared according to a process carried out by subjecting resorcinols and benzoyl chloride or benzoic acid to Friedel-Crafts reaction in the presence of $AlCl_3$ or $ZnCl_2$ as a catalyst. This process, however, has such drawback that a moisture absorptive and difficulty handleable anhydrous aluminum chloride or anhydrous zinc chloride is required to be used in an amount of at least 1 mole per mole of resorcinol.

As improvements of said process, methods using an iron powder were proposed (Japanese patent publication No. 2,071/66 and U.S. Pat. 2,861,104). Even when said improved methods are adopted, however, the yields of 2,4-dihydroxybenzophenones are low and no such drawbacks as mentioned below can be overcome. That is, resorcinols to be used should first be esterfied or etherified, as disclosed in Japanese patent publication No. 20,701/66 and U.S. Pat. 2,861,104. Further, according to said methods, the yields of the desired products are low (71%, according to U.S. Pat. 2,861,104), and reddish brown resorcinol-benzein is by-produced in large quantities in the reaction products.

As another process, there is known a method in which an aqueous resorcinol solution is reacted with benzotrichloride (Berichte, 27, 1997). However, this method also is great in by-production of resorcinol-benzein and is low in yield, as clearly described in said literature. (The literature merely describes that the yield is low, and no concrete yield is disclosed therein. According to the test carried out by the present inventors, however, the yield was at most 60%). Accordingly, it was difficult to utilize said method on commercial scale.

As a process similar to said method, there has recently been proposed a process in which an aqueous alkali solution of a phenol is reacted with a benzotrichloride in the presence of an alkali metal iodide as a catalyst (Japanese patent publication No. 104/67). However, this process also is markedly low in yield, 39%, as seen in the examples thereof.

DISCLOSURE OF THE INVENTION

As the result of studies on an improved process for preparing 2,4-dihydroxybenzophenones which is free from the above-mentioned drawbacks, the present inventors have accomplished the present invention.

It is therefore an object of the present invention to provide a process for preparing 2,4-dihydroxybenzophenones which is entirely free from the aforesaid drawbacks, and in which the desired products can be easily produced at low costs and in markedly high yields without by-production of reddish brown resorcinol-benzein.

The above object can be achieved by reacting resorcinols with benzotrichlorides in the presence of a mixed solvent comprising water and a water-soluble organic solvent such as a lower alcohol, lower fatty acid, or the like.

The advantages of the present process are such that the desired products can be obtained according to such a simple procedure that solutions of resorcinols are reacted with benzotrichlorides (in the form of liquids) or solutions therefore, in effecting on commercial scale, the present process can be readily practiced not only in batch-wise manner but also in continuous manner.

The present process will be explained in detail below.

2,4-dihydroxybenzophenones prepared in accordance with the present process are compounds represented by the general formula

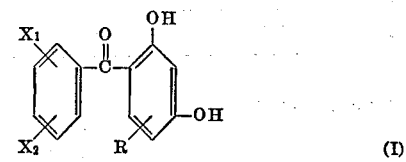

(I)

wherein $X_1$ and $X_2$, which may be same or different, are individually hydrogen, a nitro group or a halogen, i.e. fluorine, chlorine, bromine or iodine, preferably chlorine or bromine; and R is hydrogen, a $C_1$–$C_{18}$ alkyl, alkenyl or aralkyl group, (said group may have been branched or may have been substituted by a halogen such as chlorine or bromine) or a halogen, i.e., fluorine, chlorine, bromine or iodine, preferably chlorine or bromine. These compounds are useful ultraviolet ray-absorbing agents and intermediates thereof which are extensively used at present.

According to the present process, the benzophenones having the above-mentioned general formula are prepared in such a manner that a benzotrichloride having the general formula

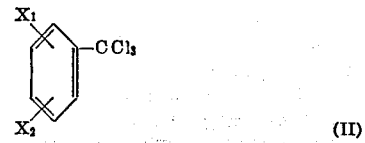

(II)

where $X_1$ and $X_2$ are as defined above, is reacted with a resorcinol having the general formula

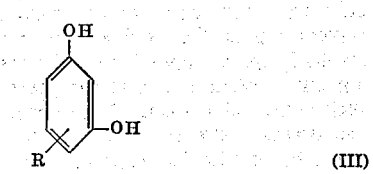

(III)

wherein R is as defined above, in a mixed solvent comprising water and an organic solvent, preferably a water-soluble organic solvent. The above reaction sufficiently progresses in the absence of catalyst to give the desired products in high yields, though in the reaction, the use of a small amount of a catalyst is not objectionable.

Organic solvents to be used in the present process are preferably those which are dissolved in water to a certain extent and those which have affinity for water. Examples of these solvents are lower alcohols such as methanol, ethanol, propanol, isopropanol, butanol, isobutanol, sec.-butanol, tert.-butanol, ethylene glycol, diethylene glycol, propylene glycol, dipropylene glycol, methoxyethanol, methoxybutanol, ethoxyethanol, glycerin, trimethylolpropane, sorbitol and pentaerythritol, lower fatty acids such as oxalic, acetic, monochloroacetic, propionic, formic, succinic and maleic acids, dioxanes, dimethylsulfoxide and tetrahydrofuran. These organic solvents may be used either independently or in admixture of 2 or more. The mixing proportions of these organic solvents and water vary depending on the kind of organic solvents. Ordinarily, however, the organic solvents are used in a proportion of 10–95%, preferably 20–90% by weight based on the weight of water. Examples of the relationship between the mixing proportions of organic solvents, the yields, and the amounts of by-produced resorcinol-benzein are as set forth in Tables 1 and 2.

TABLE 1.—INFLUENCE OF MIXING PROPORTIONS OF ISOPROPANOL AND WATER

[Tested by use of 88 g. of resorcinol]

| IPA (weight percent) | Yield of 2,4-dihydroxy-benzophenone (percent) | Amount of by-produced resorcinol-benzein (g.) |
| --- | --- | --- |
| 100 | 63.1 | 21.2 |
| 80 | 75.3 | 17.3 |
| 50 | 90.0 | 0.0 |
| 30 | 91.5 | 0.0 |
| 20 | 79.2 | 0.0 |
| 0 | 60.4 | 11.0 |

TABLE 2.—INFLUENCE OF MIXING PROPORTIONS OF DIOXANE AND WATER

[Tested by use of 88 g. of resorcinol]

| Dioxane (weight percent) | Yield of 2,4-dihydroxy-benzophenone (percent) | Amount of by-produced resoricinol-benzein (g.) |
| --- | --- | --- |
| 50 | 82.5 | 0 |
| 40 | 83.0 | 0 |
| 30 | 82.8 | 0 |

The amount of solvent employed is not particularly limited, but is preferably at least 1.5 times the weight of fed resorcinol.

In the present process, the feeding order of reactants is such that a benzotrichloride may be added dropwise to a solution of a resorcinol, or a solution of a resorcinol may be added dropwise to a benzotrichloride. Alternatively, the two may be simultaneously reacted in definite proportions either intermittently or continuously. However, benzotrichlorides are readily hydrolyzable, and therefore it is not desirable to dissolve only benzotrichloride in a mixed solvent comprising water and organic solvent.

In the above reaction, if water or an organic solvent is dependently used as the solvent, the yield is low and the amount of by-produced resorcinol-benzein is large, and only when a mixed solvent comprising water and organic solvent is used, the yield is 85% or more and thus is substantially quantitative. This indicates, without necessitating any explanation, that the present process, in which such mixed solvent is used, is extremely great in industrial and practical effects. That is, in products of the conventional Friedel-Crafts reaction, or in reaction products obtained by using as the solvent only water or organic solvent, reddish brown resorcinol-benzein, which is a side reaction product, is contained in large quantities. Accordingly, the purification of said reaction products and the isolation of desired 2,4-dihydroxybenzophenones from the reaction products are extremely difficult. In such cases, therefore, the products should be purified in such a manner that they are distilled under such severe conditions as high vacuum and considerably high temperatures and are further recrystallized from a solvent.

In contrast thereto, according to the present process, the yields are substantially quantitative and no or little resorcinol-benzein is by-produced, and therefore the reaction products can be purified with extreme ease by mere recrystallization from a solvent. In view of the above-mentioned easiness in purification, coupled with the favorableness in yields, the present process is a novel process in which the desired products can be obtained at extremely low costs on commercial scale.

In the present process, the above-mentioned procedure for isolation and purification more or less varies depending on the kind of organic solvent employed. That is, when an alcohol has been used, the excess benzotrichloride employed in the reaction is hydrolyzed to a corresponding benzoic acid ester. This ester can be removed by distillation, preferably by steam distillation. On the other hand, when other organic solvent such as a lower fatty acid or dioxane has been used, no ester is formed but a benzoic acid corresponding to the excess benzotrichloride employed is formed. The thus formed benzoic acid can be removed by recovering the organic solvent from the reaction liquid and neutralizing the liquid with a 5% aqueous caustic solution, followed by water-washing. After removing the benzoic acid or ester thereof in the above manner, the reaction product is recrystallized from a benzene type solvent, e.g. benzene, toluene or xylene, whereby the desired product can be completely isolated and purified.

The amount of benzotrichloride to be fed is at least 0.8 mole, preferably 1.0 to 1.4 moles, per mole of resorcinol. If the amount of benzotrichloride is less than 0.8 mole, the resulting product is lowered in yield based on resorcinol, and the amount of by-produced resorcinol-benzein becomes larger. It is not objectionable to use more than 1.4 moles of benzotrichloride. That is, the introduction of 2 moles of benzoyl group per mole of resorcinol does not result in particular increase in amount of by-produced resorcinol-benzein. Even in such a case, however, the yield is not increased and therefore the use of benzotrichloride in an amount of more than 1.4 moles is not desirable from the economical standpoint.

The reaction temperature more or less varies depending on the kind of the starting materials resorcinol and benzotrichloride, but is ordinarily above room temperature, preferably from 40° to 120° C. At below room temperature, the reaction scarcely progresses or progresses marked slowly, and at above 120° C., the reaction is excessively vigorous. Further, the boiling points of reaction solvents are less than 120° C. in most cases, and therefore the adoption of temperatures above 120° is not desirable.

The reaction time is not particularly limited but is ordinarily within 10 hours. In most cases, the reactants react instantaneously, so that the reaction is substantially complete in a period required for the dropwise addition, and no effect can be attained even if the reaction is effected for a longer period of time.

Examples of the compounds obtained in accordance with the present process are as follows:

(1) 2,4-dihydroxybenzophenone
(2) 2,4-dihydroxy-5-chlorobenzophenone
(3) 2,4-dihydroxy-5-ethylbenzophenone
(4) 2,4-dihydroxy-5-(2-ethylhexyl)-benzophenone
(5) 2,4-dihydroxy-5-stearylbenzophenone
(6) 2,4-dihydroxy-5-benzylbenzophenone
(7) 2,4-dihydroxy-5-allylbenzophenone
(8) 2,4-dihydroxy-2'-chlorobenzophenone
(9) 2,4-dihydroxy-2'-bromobenzophenone
(10) 2,4-dihydroxy-3'-nitrobenzophenone
(11) 2,4-dihydroxy-4'-chlorobenzophenone
(12) 2,4-dihydroxy-2',4'-dichlorobenzophenone
(13) 2,4-dihydroxy-5-ethyl-2'-chlorobenzophenone
(14) 2,4-dihydroxy-5,2',4'-trichlorobenzophenone As is apparent from above and the examples below the R is preferably in the 5 position in Formula I and in the 4 position in Formula III.

The following examples concretely illustrate the process of the present invention.

Example 1

176 g. (1.6 moles) of resorcinol and 880 g. of a 50% aqueous isopropanol solution were charged into a 2 liter, four-necked flask provided with a Dimroth condenser, a thermometer, a 200 ml. dropping funnel and a stirrer, and the flask was heated to 50°–60° C in an oil bath. Subsequently, 376 g. (1.92 moles) of benzotrichloride was gradually added dropwise through the dropping funnel to the flask, and the mixture was reacted at 70°–80° C. After completion of the dropwise addition, the mixture was stirred for 1 hour at said temperature to complete the reaction. To the reaction liquid, 200 g. of water was added, and isopropanol was distilled off at atmospheric pressure. After cooling to room temperature, the liquid was filtered and the cake was charged in a vessel. The vessel was further charged with 200 g. of water and was then heated to dissolve the cake. In this state, the liquid was neutralized with a 50% aqueous caustic soda solution, and the aqueous layer was adjusted to pH 6.8–7.0. The liquid was again cooled and filtered, and the cake was dissolved in hot toluene. To the solution, active clay was added; and the mixture was azeotropically dehydrated. At the time when no more water had substantially been extracted, the mixture was filtered at an elevated temperature, and the filtrate was mixed with a liquid formed by washing active clay on the filter with hot toluene. Subsequently, the mixed liquid was cooled and crystallized, whereby pale yellowish white crystals were deposited. The crystals were recovered by filtration and were then dried to obtain 304 g. of crystalline 2,4-dihydroxy-benzophenone, yield 90% (based on resorcinol), M.P. 143°–144° C.

Example 2

Experiment was effected in the same manner as in Example 1, except that a 50% aqueous 1,4-dioxane solution was used as the solvent, whereby 2,4-dihydroxybenzophenone was obtained in a yield of 82.5%.

Example 3

Experiment was effected in the same manner as in Example 1, except that a 50% aqueous acetic acid solution was used as the solvent, whereby 2,4-dihydroxybenzophenone was obtained in a yield of 89.0% (the amount of by-produced benzein was 0.1 g.).

Example 4

In the same manner as in Example 1, 176 g. of resorcinol was reacted with 211 g. of 4-chloro-benzotrichloride at 70°–80° C. in 880 g. of a 40% aqueous isopropanol solution to obtain 189.0 g. of pale yellow crystals of 2,4-dihydroxy-4'-chlorobenzophenone, yield 95% (based on resorcinol), M.P. 149.5°–150.5° C.

Example 5

In the same manner as in Example 4, 176 g. of resorcinol was reacted, using the same solvent as in Example 4, with a solution of 211 g. of 2-chloro-benzotrichloride in 50 g. of isopropanol to obtain 170.2 g. of white crystals of 2,4-dihydroxy - 2' - chlorobenzophenone, yield 85.6% (based on resorcinol), M.P. 135.5°–136.5° C.

Example 6

In the same manner as in Example 4, 11.6 g. of 4-chloro-resorcinol was reacted in a 250 ml. four-necked flask with 18.8 g. of benzotrichloride, using 88 g. of the same solvent as in Example 4, to obtain 17.7 g. of yellow crystals of 2,4-dihydroxy-5-chlorobenzophenone, yield 89% (based on 4-chloro-resorcinol), M.P. 142°–143° C.

Example 7

In the same manner as in Example 6, 11.6 g. of 4-chloro-resorcinol was reacted with 22.0 g. of 4-chloro-benzotrichloride to obtain 18.4 g. of yellow crystals of 2,4-dihydroxy-5,4'-dichlorobenzophenone, yield 85% (based on 4-chloro-resorcinol), M.P. 188.5°–189.5° C.

Example 8

In the same manner as in Example 7, 11.6 g. of 4-chloro-resorcinol was reacted with a solution of 22.0 g. of 2-chloro-benzotrichloride in isopropanol to obtain 19.3 g. of white crystals of 2,4-dihydroxy-5,2'-dichlorobenzophenone, yield 81% (based on 4-chloro-resorcinol), M.P. 187°–188° C.

Example 9

In the same manner as in Example 7, 11.1 g. of 4-ethyl-resorcinol was reacted in a 100 ml. four-necked flask with 17.6 g. of benzotrichloride, using 55 g. of a 40% aqueous acetic acid solution as the solvent, to obtain 15.8 g. of yellow crystals of 2,4-dihydroxy-5-ethyl-benzophenone, yield 82% (based on 4-ethyl-resorcinol), M.P. 99.5°–100.5° C.

Example 10

In the same manner as in Example 7, 19.4 g. (0.1 mole) of n-hexyl-resorcinol was reacted with a solution of 27.6 g. of 2-chloro-benzotrichloride in isobutanol, using 150 g. of a 20% aqueous isobutanol solution as the solvent, to obtain 25.8 g. of a substantially white substance, yield 77.5% (based on n-hexyl-resorcinol).

Elementary analysis for 2,4-dihydroxy-5-hexyl-2'-chlorobenzophenone:

Found, Cl: 10.3%
Calculated, Cl: 10.67%

As is apparent from Tables I and II and Examples 1 through 10, the preferred mixed solvent consists essentially of water and 20 to 50 percent by weight of a solvent selected from the group consisting of isopropanol, isobutanol, 1,4-dioxane and acetic acid.

We claim:

1. A process for preparing 2,4-dihydroxybenzophenones represented by the formula

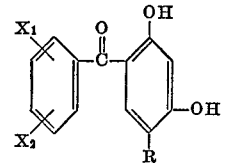

(I)

wherein $X_1$ and $X_2$ are independently selected from the group consisting of hydrogen, nitro groups fluorine, chlorine, bromine and iodine; and R is independently selected from the group consisting of hydrogen, $C_1$–$C_{18}$ alkly groups, alkenyl groups, aralkyl groups fluorine, chlorine, bromine and iodine which comprises reacting a benzotrichloride represented by the formula

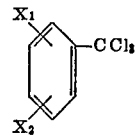

(II)

wherein $X_1$ and $X_2$ are as defined above, at a temperature from about 40° C. to about 120° C. with a resorcinol represented by the formula

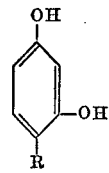

wherein R is as defined above, in a mixed solvent consisting essentially of water and from 20 to 50 percent by weight of a solvent selected from the group consisting of isopropanol, isobutanol, 1,4-dioxane and acetic acid.

2. A process as claimed in claim 1 wherein said benzotrichloride is reacted in an amount of at least about 0.8 mole per mole of said resorcinol.

3. A process as claimed in claim 2 wherein said benzotrichloride is reacted in an amount of from 1.0 to 1.4 moles per mole of said resorcinol.

4. A process as claimed in claim 1 wherein said 2,4-dihydroxybenzophenone is isolated and purified by recrystallization from an organic solvent selected from the group consisting of benzene, toluene and xylene.

References Cited
FOREIGN PATENTS

| 10,095 | 1980 | Great Britain | 260—591 |
| 54,661 | 11/1890 | Germany | 260—591 |

OTHER REFERENCES

Kamarowski et al.: Ber. Deut. Chem. 27, 1997–2000 (1894).

LEON ZITVER, Primary Examiner

J. E. EVANS, Assistant Examiner